United States Patent
Appleford et al.

(10) Patent No.: US 6,598,853 B1
(45) Date of Patent: Jul. 29, 2003

(54) PLUG VALVE WITH CAM ACTUATED SEAL MEANS

(75) Inventors: David Eric Appleford, Epping (GB); Brian William Lane, Canvey Island (GB)

(73) Assignee: Alpha Thames Limited, Essex (GB)

( * ) Notice: Subject to any disclaimer, the term of this patent is extended or adjusted under 35 U.S.C. 154(b) by 0 days.

(21) Appl. No.: 09/786,071

(22) PCT Filed: Aug. 25, 1999

(86) PCT No.: PCT/GB99/02800

§ 371 (c)(1),
(2), (4) Date: Feb. 23, 2001

(87) PCT Pub. No.: WO00/11382

PCT Pub. Date: Mar. 2, 2000

(30) Foreign Application Priority Data

Aug. 25, 1998 (GB) ............................................. 9818527

(51) Int. Cl.[7] ................................................. F16K 5/18
(52) U.S. Cl. ........................................ 251/162; 251/192
(58) Field of Search ................................. 251/162, 163, 251/160, 159, 170, 192, 309

(56) References Cited

U.S. PATENT DOCUMENTS

| 1,888,000 A | 11/1932 | Heggem |
| 2,609,174 A | 9/1952 | Heinen |
| 2,696,968 A | 12/1954 | De Fillips |
| 2,708,094 A | 5/1955 | Heinen |
| 4,442,996 A | * 4/1984 | Erwin ........................ 251/77 |

FOREIGN PATENT DOCUMENTS

| WO | 9114892 | 10/1991 |
| WO | 9423228 | 10/1994 |
| WO | 0011382 | 3/2000 |

* cited by examiner

Primary Examiner—Kevin Lee
(74) Attorney, Agent, or Firm—Summa & Allan, P.A.

(57) ABSTRACT

A rotary valve for blocking opposed apertures of a valve body includes a central assembly comprising laterally offset hemi-cylindrical first camming surfaces on an exterior of a rotatable spool and substantially hemi-cylindrical seal plates with hemi-cylindrical first cam following surfaces which engage the first camming surfaces. Stop pins fixed to the valve body run in rebates in the seal plates to limit rotation of the seal plates to 90°. Each of four clearance members is supported by a wedging block loosely located in a recess in the spool, slidingly extends through a radial slot in one of the seal plates and prevents the spool jamming the seal plate against an inner face of the valve body during closing of the valve until a projecting end of the clearance member enters a recess in the valve body.

26 Claims, 16 Drawing Sheets

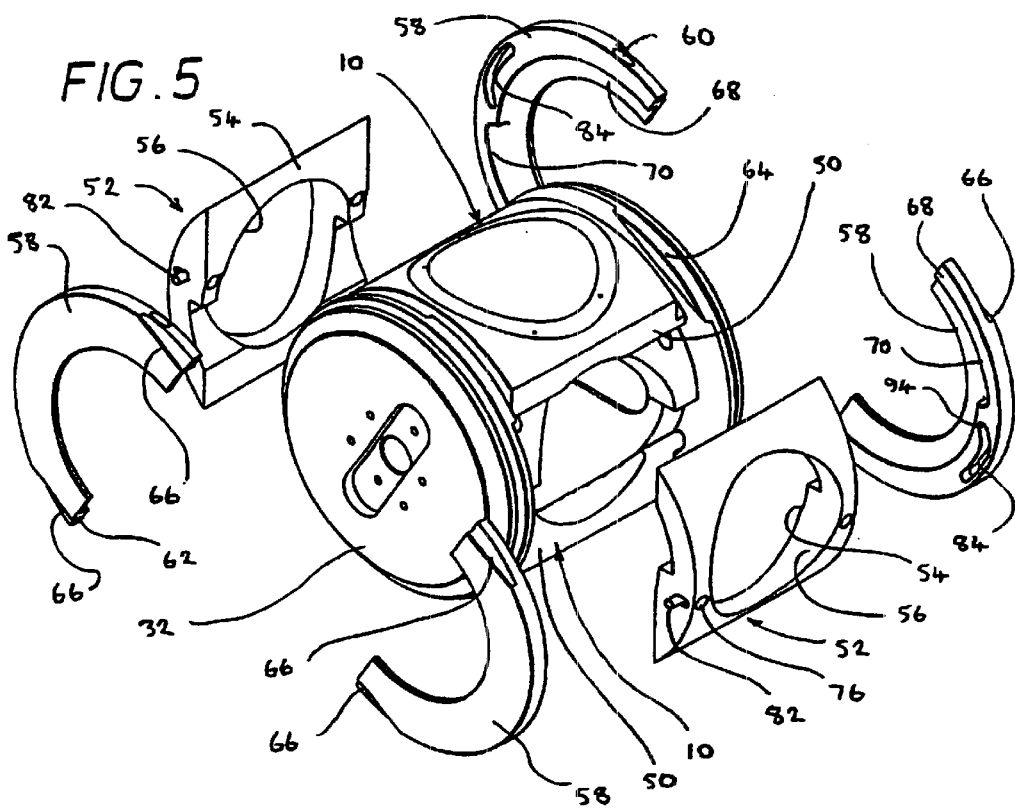
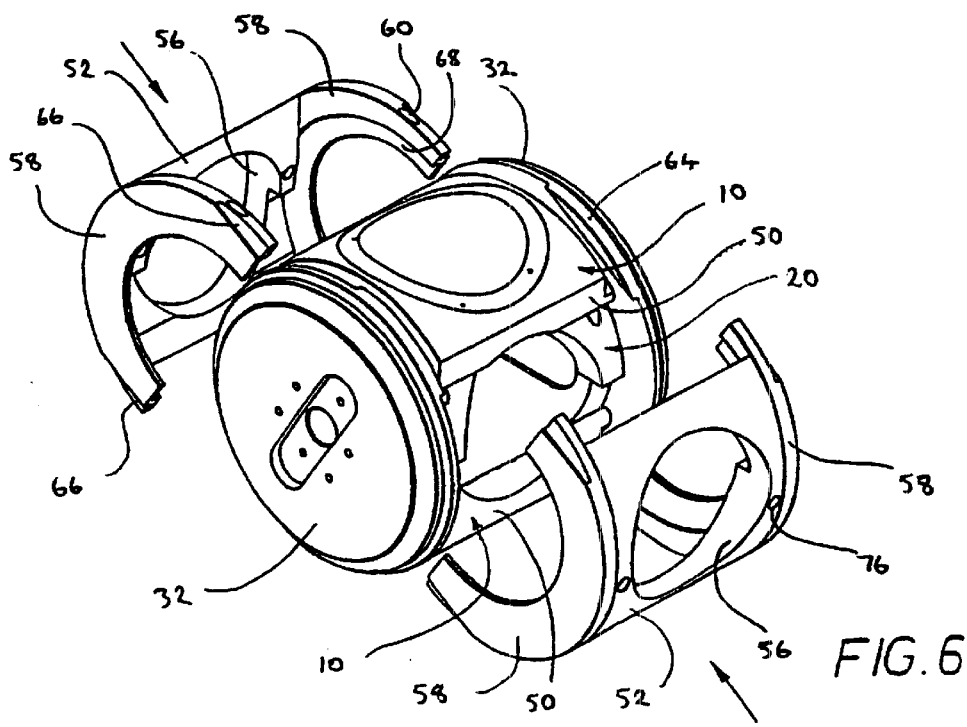

PLUG VALVE WITH CAM ACTUATED SEAL MEANS

BACKGROUND OF THE INVENTION

The present invention relates of a valve of the type generally having seal plates which are urged outwardly against inner surfaces of a valve body to block flow through valve body apertures, and in which the seal plates are moved inwardly away from the valve body prior to rotation to move the seal plates away from the apertures to permit flow through the valve.

Typical prior art valves of this type have a tapered central member which is forced in a direction perpendicular to that of the flow through the valve to press seal plates against inner surfaces of a body of the valve by a wedging action. Opening of such a valve is effected by first withdrawing the tapered member slightly to remove the force urging the seal plates against the valve body followed by rotation of the tapered member by 90° to rotate the seal plates away from the opposed apertures in the valve body and align a through bore in the tapered member with the apertures for permitting flow through the valve. Closing of the valve includes a reversal of the above described two stage process. In such valves, the provision of an actuating mechanism which accommodates the lost motion associated with movement of the tapered member perpendicular to flow through the valve and provides a two stage actuation sequence involving translational and rotational movement adds undesirably to the size and complexity of the valve. The taper of the tapered member also adds undesirably to the size of the valve. A further adverse consequence of the use of a tapered member, is that in order to avoid the overall size of the valve being prohibitively large, the aperture therein, through which flow occurs when the valve is open, is usually less than the full bore size of pipes connected to the valve, leading to undesirable restriction of flow through the valve.

Particularly in the field of remote submarine interconnection of pipework, there exists a requirement for compact closely juxtaposed valves which can be actuated without the complications associated with prior art valves of the type described above.

SUMMARY OF THE INVENTION

An object of the invention is to provide a design of valve which permits the valve to be compact and easily actuated and avoids at least some of the disadvantages associated with prior art valves. A further object of the invention is to provide a design of valve which permits a gang of closely juxtaposed valves to be simply actuated by straightforward rotation.

A further object of the invention is to provide a valve of the above described type which avoids surfaces which are to be sealed against each other from rubbing against each other with a large force perpendicular to the surfaces as the surfaces converge towards a sealed state or depart therefrom. Such rubbing tends to lead to a high rate of wear.

Thus according to the invention there is provided a valve comprising a valve body defining a throughflow direction, two seal means which are urgeable away from each other against complementary sealing surfaces to prevent flow through the throughflow apertures and actuating means which is rotatable in an opening direction about a rotation axis substantially perpendicular to the throughflow direction to rotate each seal means from its associated throughflow aperture to allow fluid flow therethrough, wherein the valve includes restraining means for arresting rotation of each seal means by the actuating means in a closing direction opposite to the opening direction when each seal means is aligned with its associated complementary sealing surface, the actuating means including a first camming surface for each seal means which is urged against a first cam following surface of the associated seal means to urge its sealingly against its complementary sealing surface in a direction away from the rotation axis after rotation of the seal means has been arrested and upon further rotation of the actuating means in the closing direction.

As a consequence of the urging of the seal means outwardly by means of a rotary camming action, the need for the above described two stage actuation involving moving an actuation means axially and then rotating it is obviated as is the requirement for a tapered wedging member which contributed to the above described disadvantages. A plurality of valves constructed according to the invention can be closely juxtaposed in a gang and all opened or closed simultaneously by interconnecting their aligned actuating means and applying a simple turning force to one or both ends of the gang of interconnected actuating means. Furthermore, since the seal means are moved against the complementary sealing surfaces after rotation of the sealing means has been arrested, wear of the seal means and these surfaces is largely avoided.

Preferably each first camming surface is situated on the exterior of a central spool part of the actuating means in order that the first camming surfaces can bear directly on inner surfaces of the seal means and thereby provide a very compact arrangement. Furthermore, each first camming surface preferably comprises a portion of a circular cylindrical surface having its central longitudinal axis transversely offset from the rotation axis and more preferably the central longitudinal axes of the two first camming surfaces are transversely offset from the rotation axis in opposite directions. With such an arrangement, accurate machining of the first camming surfaces and complementary first cam following surfaces is facilitated since surfaces having non-circular cross-sections are avoided. A further advantage of such an arrangement is that large areas of the first camming surface and associated first cam following surface will remain in contact during camming actions thus reducing high wear rates associated with camming actions in which only small areas of the camming surfaces interact.

To facilitate production of the actuating means still further, preferably the central spool is constituted by first and second joined spool halves each having an exterior surface defining one of the first camming surfaces.

So as to avoid unnecessary valve components and ensure that the valve is as compact as possible, preferably each seal means includes a seal plate having an arcuate inner surface constituting the first cam following surface and a metal seal may be provided on an outer surface thereof.

In order to ensure that each seal means is clear of the valve body prior to rotation of the seal means away from the throughflow apertures, to avoid damage to the seal means or valve body, preferably the actuating means includes a second camming surface for each seal means against which a second cam following surface bears which is urged towards the rotation axis upon initial rotation of the actuating means in the opening direction thereby drawing the seal means away from its associated complementary sealing surface.

Preferably each second camming surface and second cam following surface comprise a part of a circular cylindrical surface, so as to benefit from the advantages associated with such circular camming surfaces discussed above.

The second cam following surface of each seal means is preferably situated at an end region of the seal means and more preferably second cam following surfaces are situated at opposite end regions of each seal means, each engaged by a corresponding second camming surface of the actuating means. Such an arrangement contributes to the compactness of the valve and ensures an efficient straight withdrawal of the seal means from the throughflow apertures thus avoiding the danger of the seal means jamming as they are withdrawn. Conveniently the second camming surfaces are situated adjacent ends of a central spool part of the actuating means.

Since the seal means preferably overlie a central spool part of the actuating means, the second camming surfaces are preferably formed in plate means projecting radially outwardly with respect to the rotation axis.

In order to ensure that no rotational movement of the seal means occurs prior to their withdrawal, the valve preferably also includes restraining means for restraining the seal means against rotation about the rotation axis during initial opening rotation of the actuating means.

Conveniently the restraining means includes restraint members which slidingly engage the seal means to permit limited radially displacement of the seal means.

Particularly effective restraint of the seal means can be provided if the restraining means includes at least one displaceable latch member which is engageable for arresting rotation of each seal means.

Preferably the or each latch member is supported by one of the restraint members and radially displaceable relative thereto for engaging a corresponding aperture in the valve body.

In order to automatically effect latching and unlatch of the latch member, preferably the or each latch member includes guidance means which engages a third camming surface provided by the plate means whereby initial opening rotation of the actuating means disengages the or each latch member from the valve body.

Preferably the valve includes engagement means cooperable between the actuating means and the valve body for limiting rotation of the actuating means relative to the valve body about the rotation axis. Such engagement means will ensure that the actuating means is not rotated past the fully opened position and will also ensure that the actuating means is in the correct juxtaposition with respect to the valve body before the latch members are moved outwardly for engagement with the apertures in the valve body.

Preferably the engagement means permits between 105° and 135° of rotation of the actuating means relative to the valve body. With such an arrangement, 90° of rotation of the actuating means can be used for displacing the seal means and the remaining 15° to 45° used for effecting withdrawal of the seal means and latch members.

Preferably the restraining means comprises a stop member fixed relative to either one of the sealing means or the valve body and a stop member path with stop member end stops which is fixed relative to or defined in the other of the seal means or valve body. Such a restraining means will be easy to manufacture and will not unnecessarily complicate assembly of the valve. In order to ensure that any latching members engage smoothly and to ensure that the sealing means come to rest in precisely the correct position during oening and closing of the valve, preferably the restrainging means is configured to permit the seal means to be rotated by 90° between a valve fully closed configuration and a valve fully opened configuration.

Since the camming surfaces of the actuating means could jam the seal means against an inner surface of the valve during closing of the valve, preferably the actuating means includes a jam prevention mechanism for preventing such jamming.

A particularly effective and easily manufactured mechanism for preventing such jamming comprises a projection which extends outwardly from an outer surface of each seal means to hold the outer surface away from a surface past which it is rotated and a recess into which the projection passes upon alignment of each seal means with its complementary sealing surface. Such a mechanism can operate in hostile environments with little danger of malfunctioning.

Preferably each projection comprises an outer end of a clearance member which is radially displaceably supported in an aperture in one of the seal means. This arrangement affords a well-defined transition between a seal means rotation phase and a seal means clamping/unclamping phase of valve actuation and facilitates rotational movement of the actuating means relative to the seal means to effect an outward displacment of the seal means.

Such relative movement and movement of the clearance member radially with respect to the seal means can conveniently be accommodated when each clearance member extends inwardly from an inner surface of the seal means in which is is supported and the jam prevention mechanism further comprises a device which supports an inner end of the clearance member and permits limted rotation displacement of the actuating means relative to the seal means in the closing direction subsequent to the projection passing into the recess.

BRIEF DESCRIPTION OF THE DRAWINGS

The invention will now be described by way of example only with reference to the accompanying Figures in which:

FIGS. 3 to 6 are perspective views showing the assembly sequence leading to the arrangement shown in FIG. 1;

DETAILED DESCRIPTION OF THE PREFERRED EMBODIMENT

Figure 7:
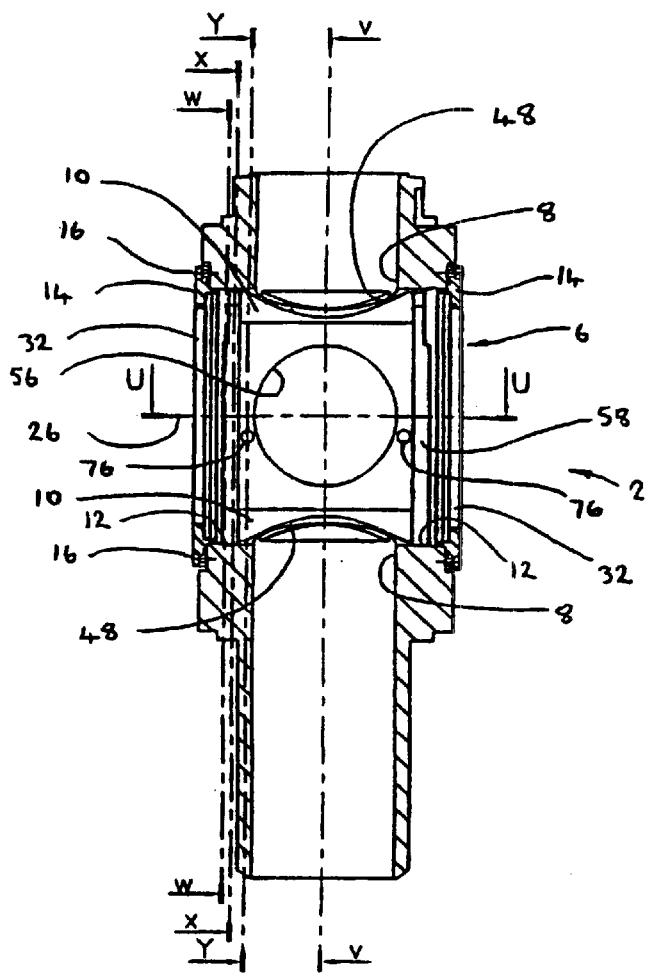
FIG. 7 is a longitudinal cross-section through a valve including the assembly shown in FIG. 1.
Figure 8:
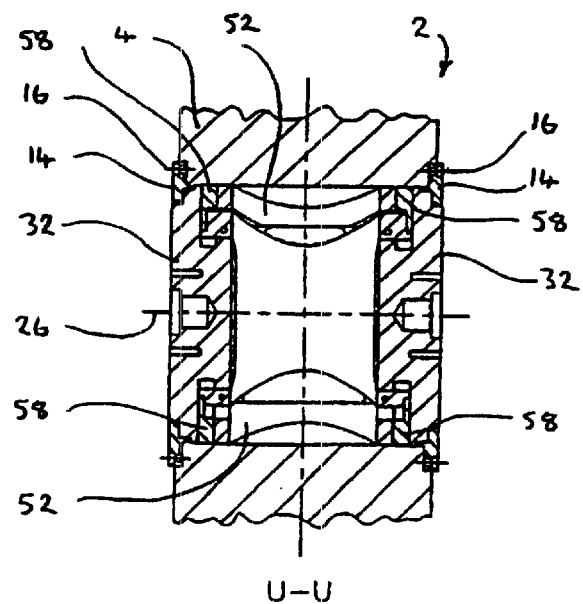
FIG. 8 is a transverse cross-section on the line UU of the valve shown in FIG. 7.

A valve 2 according to the invention is shown in longitudinal transverse cross-section in FIG. 7 and includes a valve body 4 and a central assembly 6. The valve body 4 has two throughflow apertures 8 each of which is closed off by a seal plate 10 of the central assembly 6 when the valve is closed. The central assembly 6 is situated in two aligned through bores 12 in the body 4 and held there between retaining rings 14 each of which is bolted to an outer surface of the body 4 by fastenings 16 (shown schematically). The central assembly has a central rotation axis 26 represented by the line UU in FIG. 7.

The components of the central assembly 6 and the manner in which they interact will now be described with reference to FIGS. 2 to 6 and in particular to FIG. 2.

Figure 3:
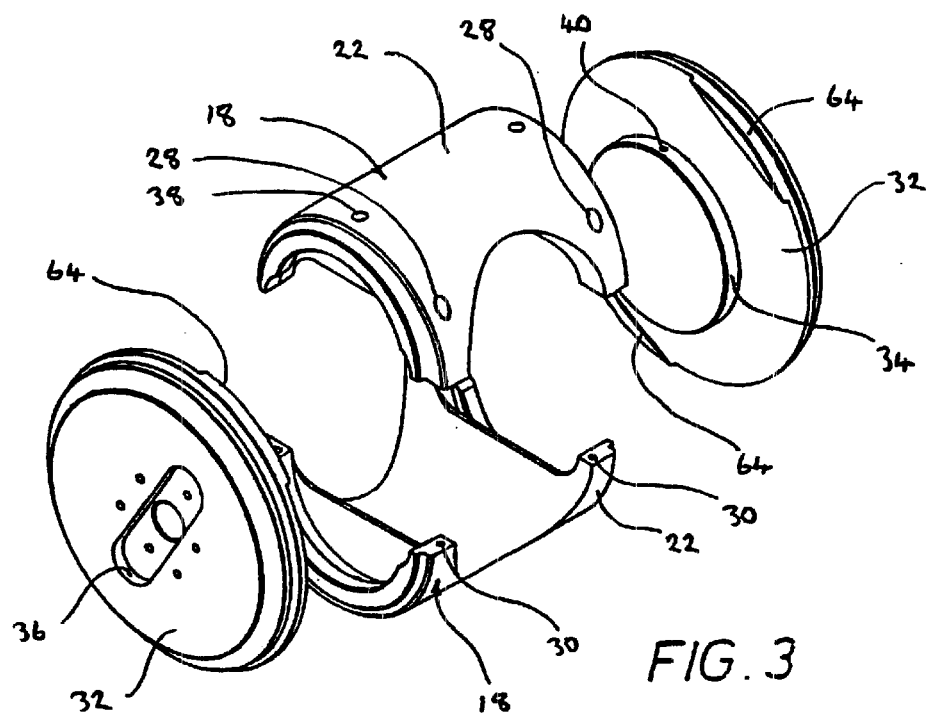
Figures 9A, 9B, 9C:
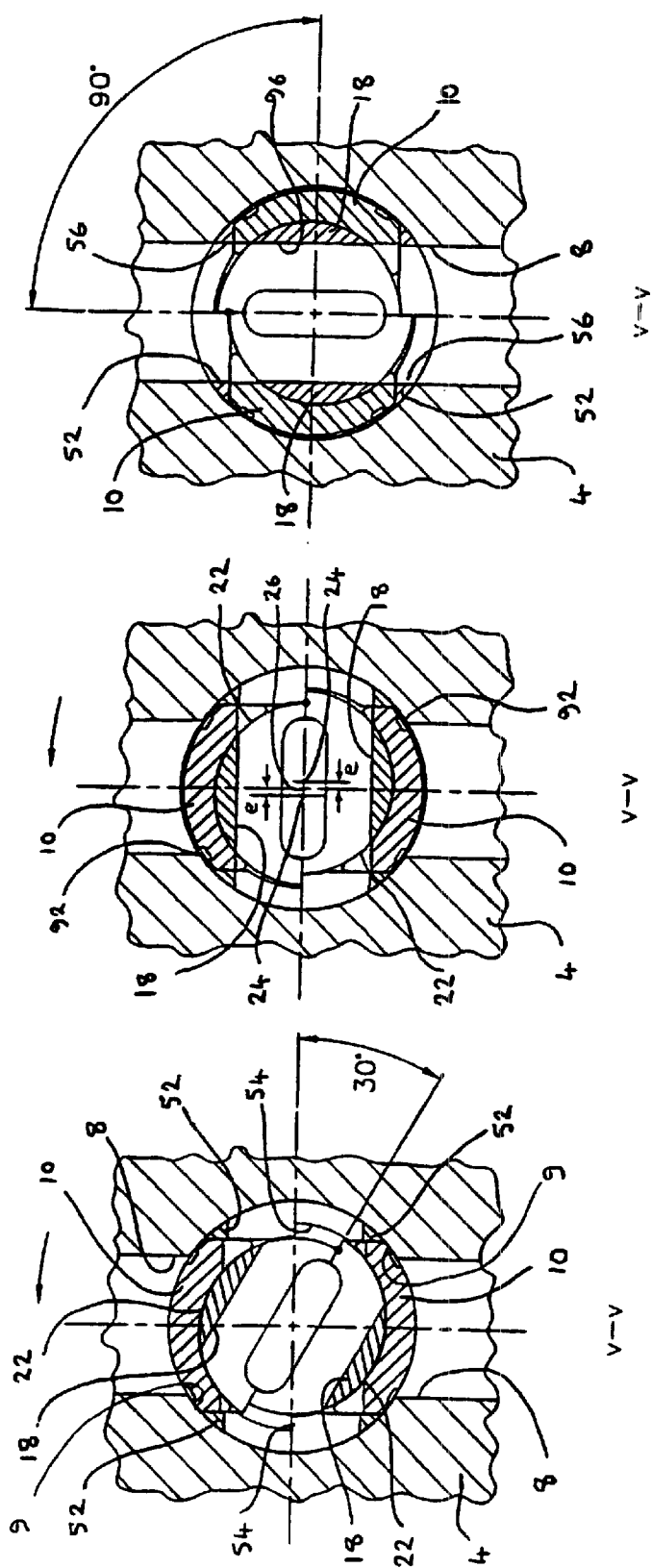
FIGS. 9a–c are central cross-sections on the line VV of the valve shown in FIG. 7 showing three different positions.

As shown in FIG. 3, the core of the central assembly is constituted by two spool halves 18 each of which has a hemi-cylindrical exterior first camming surface 22 the central longitudinal axis 24 of each of which is offset from the rotation axis 26 by a distance e (see FIG. 9b). The spool halves 18 are interconnected by fastenings (not shown) which each extend through an oblique bore 28 in one spool half 18 and engage a complementary threaded hole 30 in the other spool half. A circular end cap 32 with a raised circular boss 34 projecting from its inner side and an exterior elongate keyway 36 is connected to each end of the spool 20 by means of fastenings (not shown) each of which extends through a bore 38 in a spool half and engages a complementary tapped hole 40 in one of the bosses 34.

Figure 4:
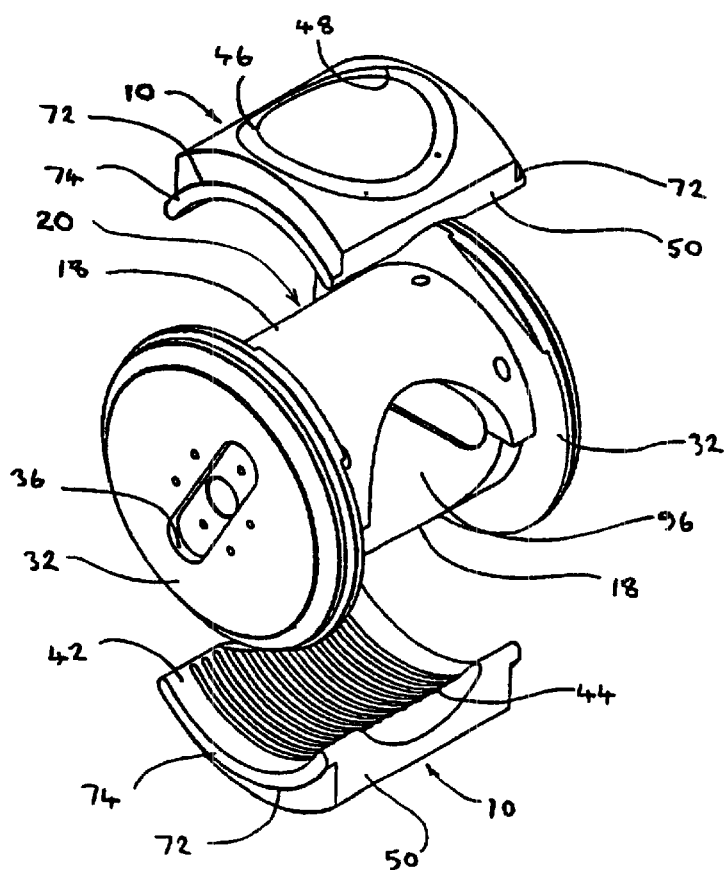

As shown in FIGS. 4 and 5, a seal plate 10 overlies each spool half 18 which extends substantially from one end cap 32 to the other and subtends approximately 90° at the rotation axis 26. The inner surface of each seal plate 10 is part cylindrical, constitutes a first cam following surface 42 and has circumferential grooves 44 formed therein for lubrication purposes. The outer surface of each seal plate 10 has a recess 48 formed therein which accommodates a substantially circular seal 46 adapted to seal against an inner surface of the valve body 4 around one of its apertures 8. Each seal plate 10 has sides 50 which are parallel with each other and the rotation axis 26. On each side of the central assembly, a substantially segment shaped restraint member or drive shoe 52 slidingly engages the aligned sides 50 of the two seal plates 10 as shown in FIGS. 5, 6 and 9. The internal faces 54 of the drive shoes 52 are configured to permit rotation of the spool 20 therebetween independently of the drive shoes 52 and seal plates 10. Each drive shoe has a substantially circular through opening 56 which has substantially the same diameter as the apertures 8 of the valve body and are aligned therewith when the valve is open (see FIG. 9c).

An annular side plate comprising two C-shaped shoe side plates 58 interconnected by fasteners (not shown), which extend through a bore 60 in one side plate 58 and engage a tapped hole 62 in the other side plate 58, is located between each end cap 32 and adjacent ends of the drive shoes 52 and the seal plates 10. Each pair of side plates 58 are constrained to rotate with the spool 20 and the end caps 32 due to diametrically opposed segment shaped projections 64 extending from the inner face of each end cap 32 which engage complementary recesses 66 in the side plates 58.

The inner surface 68 of each connected pair of side plates 58 includes two diametrically opposed radially inwardly facing second camming surfaces 70 each of which engages a second cam following surface 72 formed on a radially outwardly facing surface of a cam projection 74 extending longitudinally from each end of each seal plate 10.

Each drive shoe 52 has at each of its ends two mutually perpendicular intersecting holes, of which one is a radially disposed latching pin hole 76 in which a cylindrical latching pin 78 is slidingly accommodated and the other of which is a elongate guidance pin hole 80 which accommodates a cylindrical guidance pin 82 which is perpendicularly connected to the latching pin 78. The elongate form of the guidance pin hole 80 permits radial displacement of the guidance pin 82 which in turn radially displaces the latching pin 78. The latching pin is displaceable from an extended position in which its outer end projects from the associated drive shoe 52 into a latch hole 86 in the valve body (see FIG. 12a) to a retracted position in which its outer end does not so project (see FIG. 12b).

The inner surface 68 of each side plate 58 slidingly engages an adjacent end face of a drive shoe 52 and includes a third camming surface constituted by the inner surface of a cam slot 84 along which the associated guidance pin 82 is constrained to slide.

Figure 11:
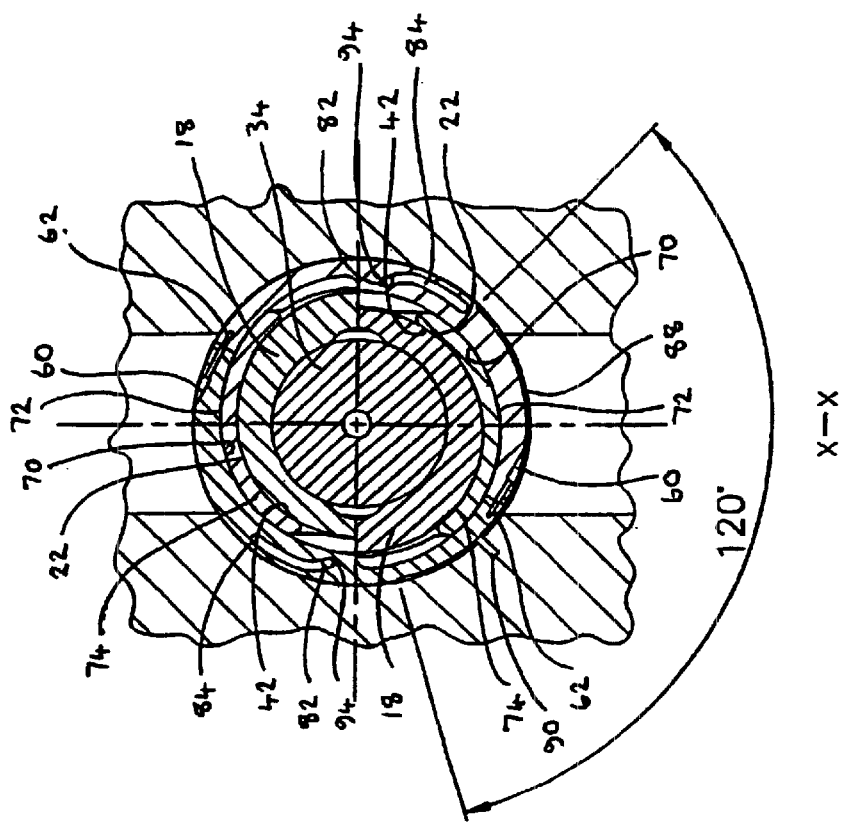
FIG. 11 is a transverse cross-sectional view on the line XX of the valve shown in FIG. 7.
Figure 10:
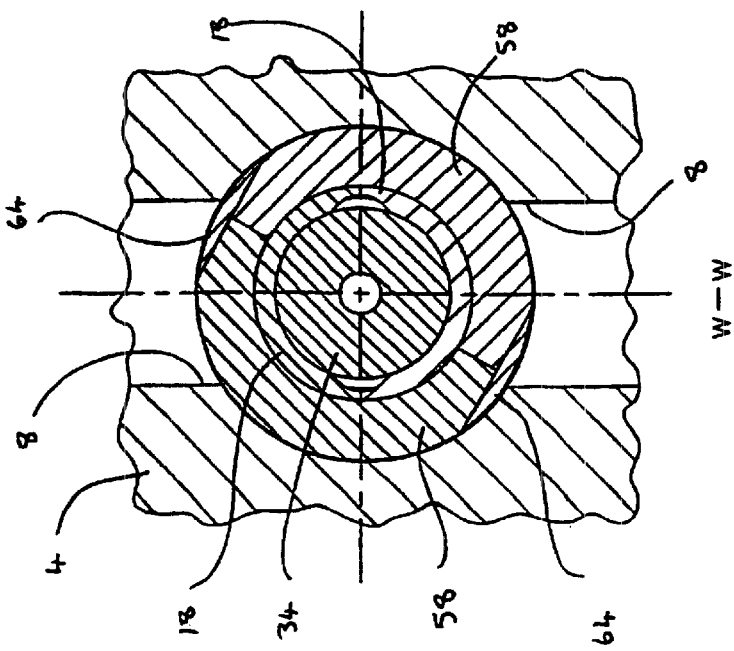
FIG. 10 is a transverse cross-sectional view on the line WW of the valve shown in FIG. 7.

As shown in FIG. 11 each pair of side plates 58 include on their outermost surface a circumferential slot 88 which subtends an angle of 120° at the rotation axis in which a stop pin 90 runs. Each stop pin 90 projects inwardly from an inner surface of each through bore 12 in the valve body. Each slot 88 is orientated so that when the valve is in its fully opened position, the stop pin 90 is at one end of the slot 88 and when the valve is fully closed, and the seal plates fully urged against the valve body, the stop pin is at the opposite end of the slot 88.

The steps involved in the actuation of the valve will now be described.

When the valve is fully closed, as shown in FIG. 9a, the two spool halves 18, due to their eccentricity and rotational position, urge the seal plates 10 away from each other against the apertures 8 in the valve body 4 thus closing the apertures. The first camming surface 22 of each spool half 18 engages and outwardly biases the first cam following surface 42 of the adjacent seal plate 10.

Figures 12A, 12B:
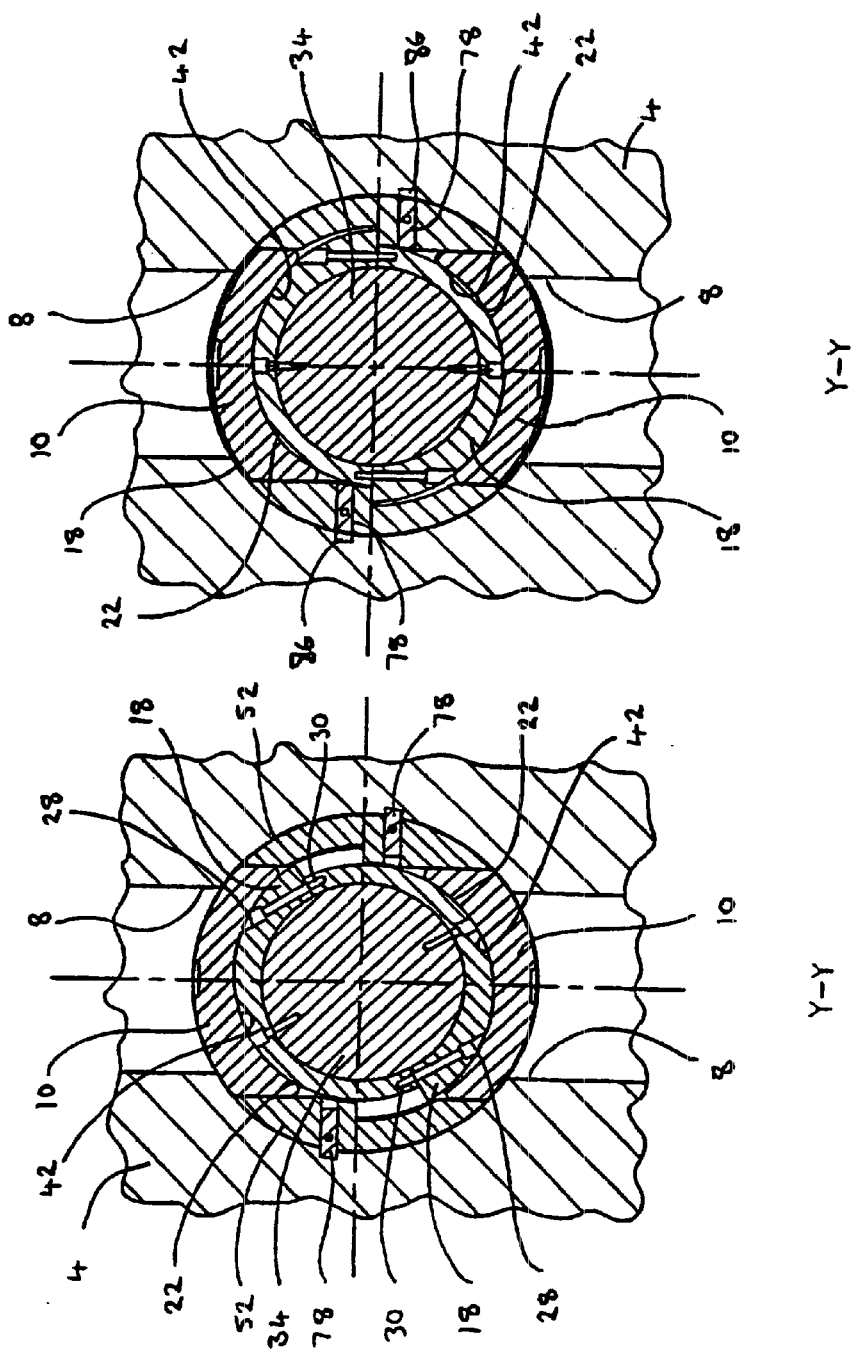
FIGS. 12a and b are transverse cross-sectional views on the line YY of the valve shown in FIG. 7.
Figure 13:
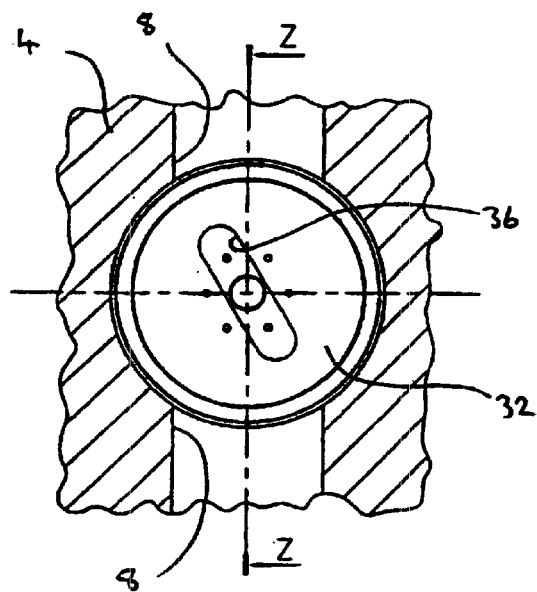
FIGS. 13 is an end view of the assembly shown in FIG. 1 positioned in a valve body.
Figure 14:
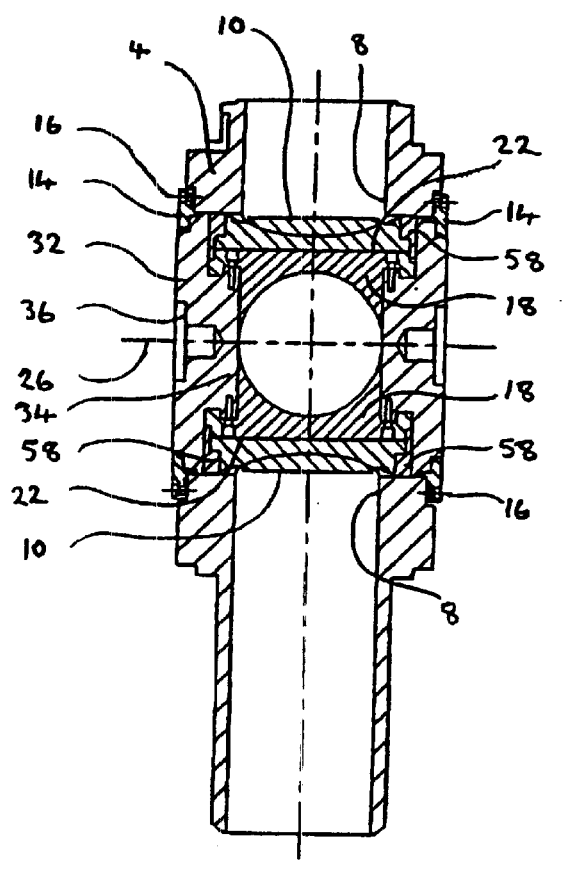
FIG. 14 is a longitudinal cross-section on the line ZZ of the valve shown in FIG. 13.

The first stage of the opening sequence involves a 30° rotation of the actuating means from the position shown in FIGS. 9a and 12a to that shown in FIGS. 9b and 12b. The components which rotate together are: end cap 32; spool 20; and side plates 58. As a consequence of the position of the cam slot 84 throughout this 30° rotation of the actuating means, the latching pins 78 project from the drive shoes 52 into their associated latch holes 86 in the valve body 4 and therefore prevent rotation of the drive shoes 52. Since the side 50 of the seal plates 10 engage inner faces of the drive shoes 52, the seal plates are also prevented from rotating about the rotation axis 26.

As the initial 30° of opening rotation is effected, three things happen simultaneously. Firstly, the outward force exerted by the spool halves 18 on the seal plates 10 is removed. Secondly, the second camming surfaces 70 on the side plates 58 bear on the associated second cam following surfaces 72 of the seal plates 10 drawing the seal plates 10 inwardly (see the small gap 92 between the seal plates 10 and the valve body in FIG. 9b). Thirdly, each side plate 58 slides around the end of the adjacent drive shoe 52 causing its cam slot 84 to move over the adjacent guidance pin 82 causing a camming action which draws the latching pin 78 connected thereto into its latching pin hole 76 until, at the point illustrated in FIGS. 9b and 12b, the outer ends of the latching pins 78 become flush with the outer surfaces of the drive shoes 52 and each guidance pin 82 reaches an end 94 of its associated cam slot 84.

Thereafter, continued rotation of the actuating means, for a further 90° from the position shown in FIGS. 9b and 12b to that shown in FIG. 9c, causes the drive shoes 52 to be drawn round because the guide pins 82 have reached the ends 94 of the cam slots 84 and the latching pins 78 are no longer engaged with the latch holes 86. Since the sides of the seal plates 10 are captive between the drive shoes 52, the seal plates 10 are also rotated around the rotation axis to the open valve configuration shown in FIG. 9c. In this configuration the through openings 56 of the drive shoes 52 are aligned with the apertures 8 in the valve body and full bore through flow is possible through the valve via a hole 96 in the centre of the spool 20. Further rotation of the central assembly 6 is prevented as a consequence of ends of the slots 88 in the side plates 5B coming into engagement with the stop pins 90 as the valve reaches its fully open position.

Closure of the valve involves a reversal of the procedure described above. In the final stage of the closing sequence, the first camming surfaces 22 on the exterior of the spool 20 urge the seals 46 on the seal plates 10 firmly into contact with the valve body 4.

Figure 15:
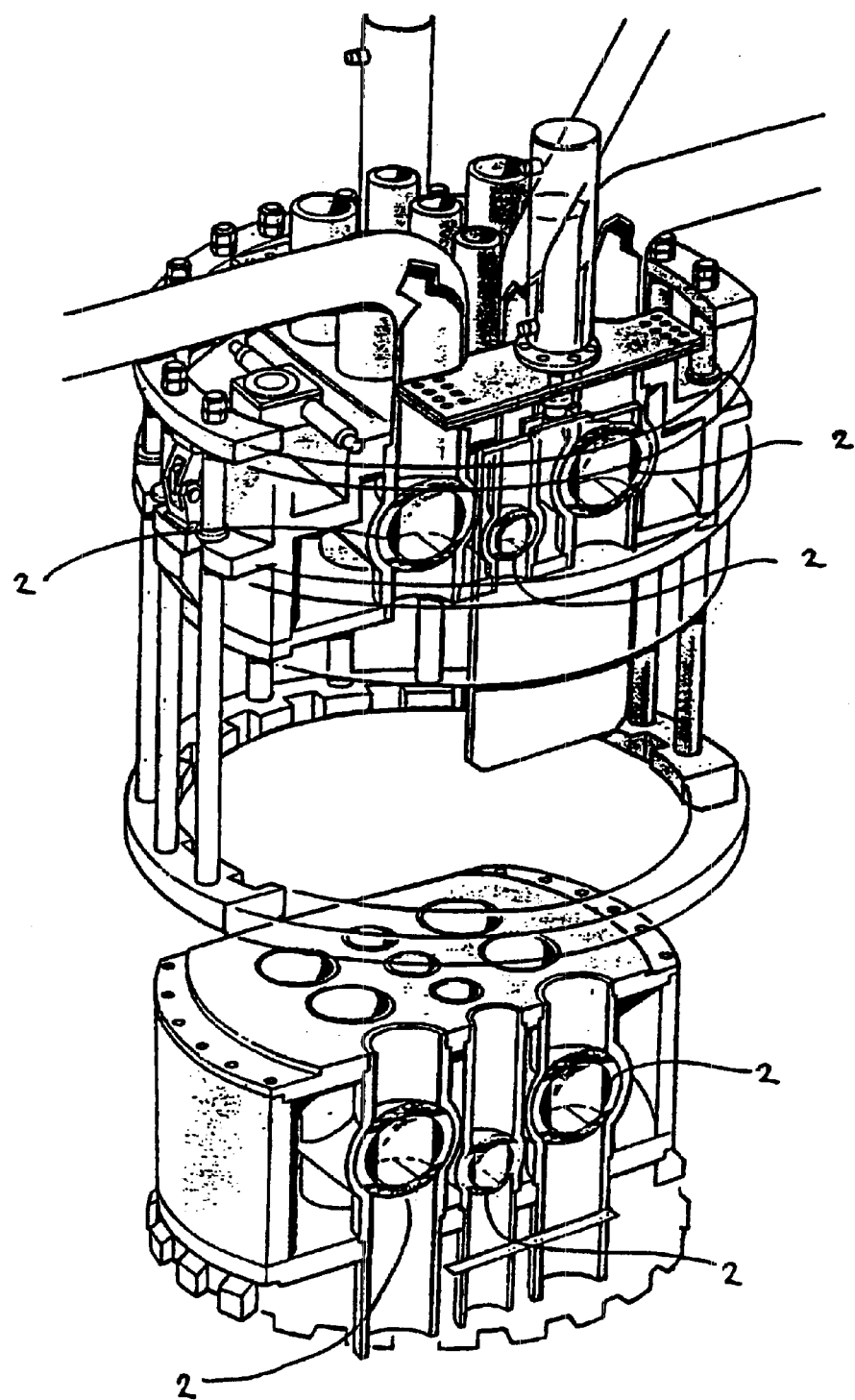
FIG. 15 is a partly broken away view of a remote submarine pipework connection unit in which valves according to the invention find particular utility.

FIG. 15 shows a remote submarine pipework interconnection module in which a valve according to the present invention finds particular utility. As a consequence of the compact form of the central assembly 6 of the valve and the manner in which opening and closing is elegantly effected by a purely rotational movement, a gang comprising three, four or more valves connected in a row with their actuating means coupled can be actuated simultaneously merely by rotating the actuating means of an end valve of the gang. The keyway 36 provided on the exterior of the end caps 32 of the valve described above is useful for interconnecting the actuating means of adjacent valves in a gang.

A second embodiment of the invention will now be described with reference to FIGS. 16 and 17 in particular. Many features of the second embodiment are the same as those of the first embodiment and are accordingly not described below. Such features are labelled in FIGS. 16 and 17 with the same numerals used to designate the corresponding parts in FIGS. 1 to 14. Only features of the second embodiment which differ from those of the first embodiment are described in detail below.

Figure 16:
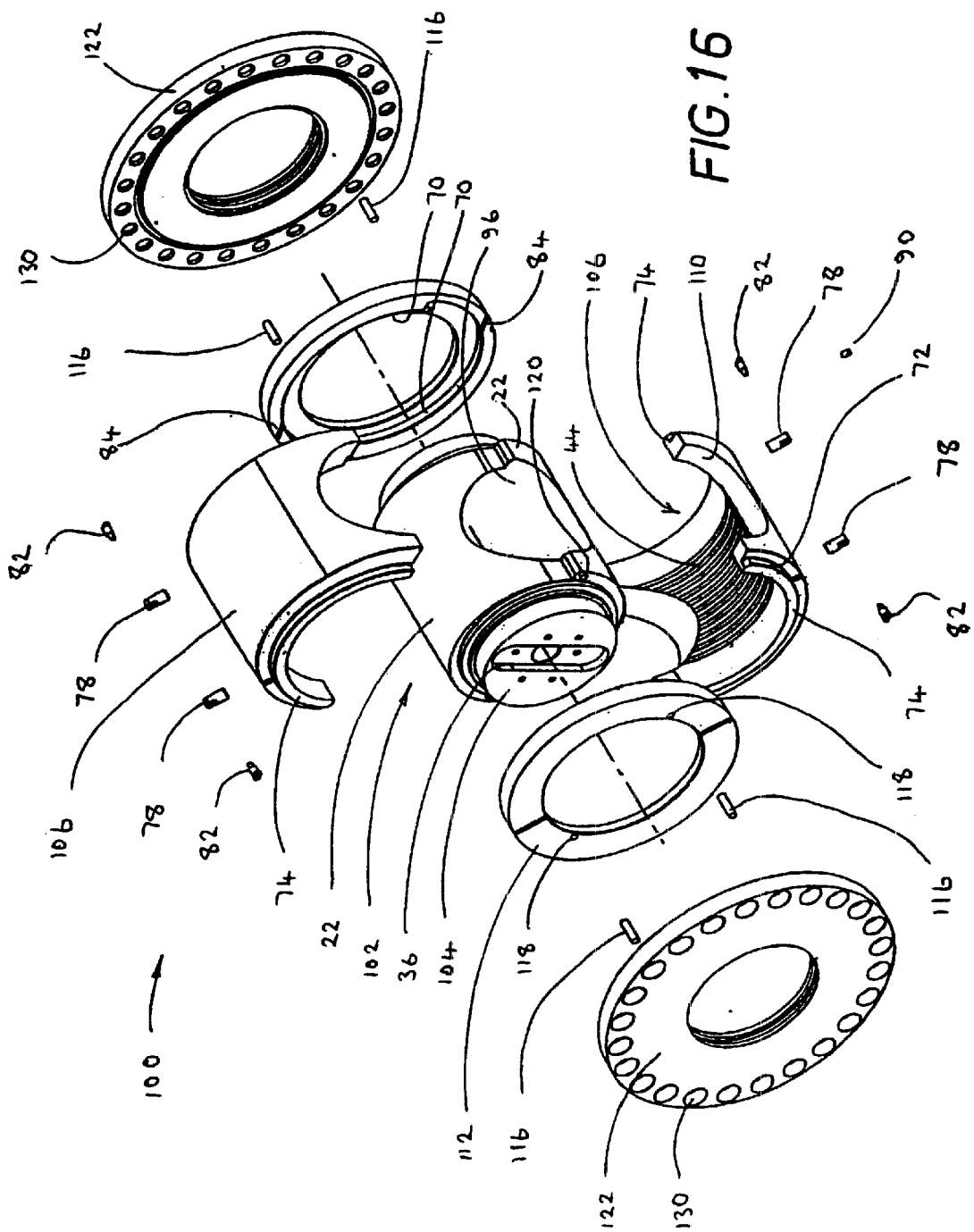
FIG. 16 is a partial exploded isometric view of a central assembly of a valve according to a second embodiment of the invention.

The valve 100 includes a body 4 substantially the same as that for the first embodiment which accommodates a central assembly 100, an exploded isometric view of which is shown in FIG. 16. The central assembly 100 includes a one piece spool 102 having a through hole 96 and a pair of first camming surfaces 22 configured and juxtaposed as in the first embodiment. A circular central boss 104 extends from each end of the spool in which a key way 36 is formed.

A substantially hemi-cylindrical seal plate 106 closely overlies each first camming surface 22, an outer sealing surface of which is adapted to seal directly against a throughflow aperture 8 of the housing 4 when the valve is closed. The central assembly 100 includes four latching pins 78 and associated guidance pins 82 which are mounted in diametrically opposed, longitudinal end regions of the seal plates 106. The interconnection and actuation of these latching an guidance pins is otherwise the same as for the first embodiment.

An annular one-piece guide plate 112 is seated on a circular, radially outer shoulder 114 situated at the base of the boss 104 at each end of the spool 102. Each guide plate has confronting second camming surfaces 70, the same as those of the first embodiment, which are engageable with second cam following surfaces 72 on outwardly facing surfaces of cam projections 74 which extend from longitudinally opposite ends of each seal plate 106. Each guide plate 112 is rotationally secured to the adjacent end of the spool 102 by means of two guide plate pins 116 each of which engages a pinhole 118 in the guide plate 112 and a corresponding anchor hole 120 in an end face of the spool 102.

Figure 17:
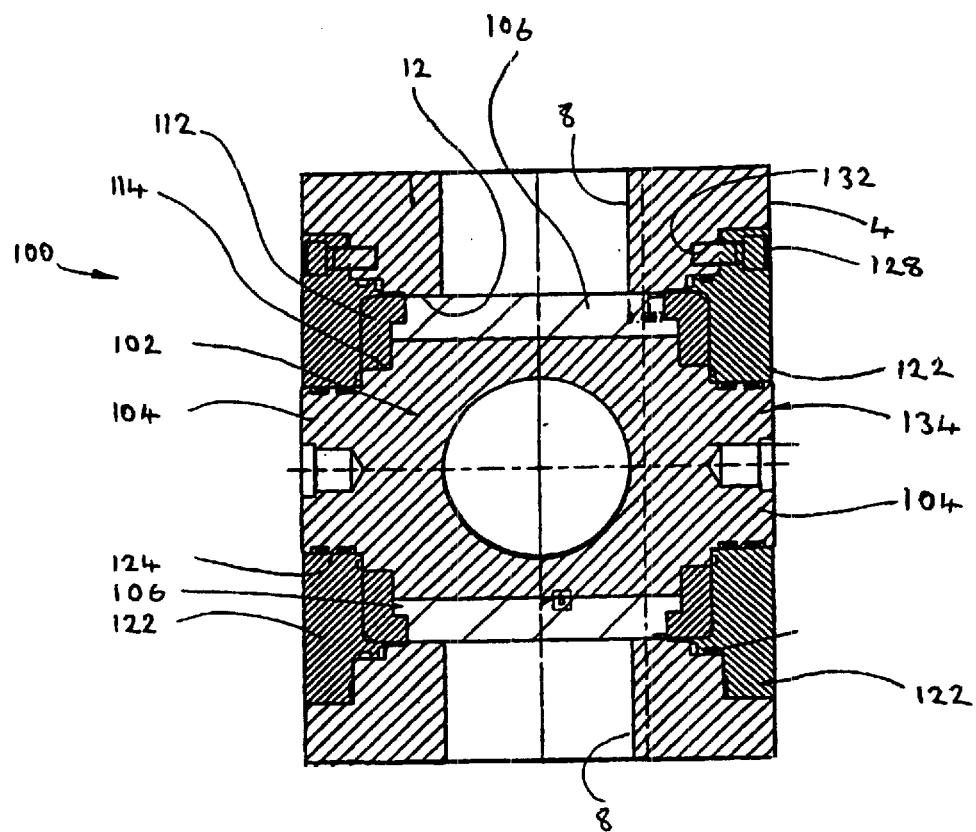
FIG. 17 is a transverse cross-section of the valve according the second embodiment of the invention.

The central assembly 100 is held in the valve body 4 as shown in FIG. 17 by a pair of retaining rings 122 each of which is seated on a radially inner shoulder 124 of one of the bosses 104 and in a rebate 126 surrounding a throughbore 12 of the valve body 4. Each retaining ring 122 is held in place by fasteners 128 which extend through holes 130 in the retaining ring and threadedly engage bores 132 in the valve body 4. The components are dimensioned so that an outer face of each boss 104 is substantially flush with adjacent outer faces of the retaining ring 122 and valve body 4.

The manner in which the second embodiment of the valve is opened and closed is substantially the same as the manner in which the first embodiment is opened and closed. The main difference is that, since the seal plates 10 and drive shoes 52 of the first embodiment have been replaced in the second embodiment with larger substantially hemi-cylindrical seal plates 106 which accommodate the latching and guidance pins, near the end of the valve closing sequence and after rotation of the seal plates 106 has been arrested by engagement with inner surfaces of the valve body 4, continued rotation of the spool 102 and guide plates 112 drives the latching pins radially out of the seal plates 106 to directly lock them against further rotation.

Figure 1:
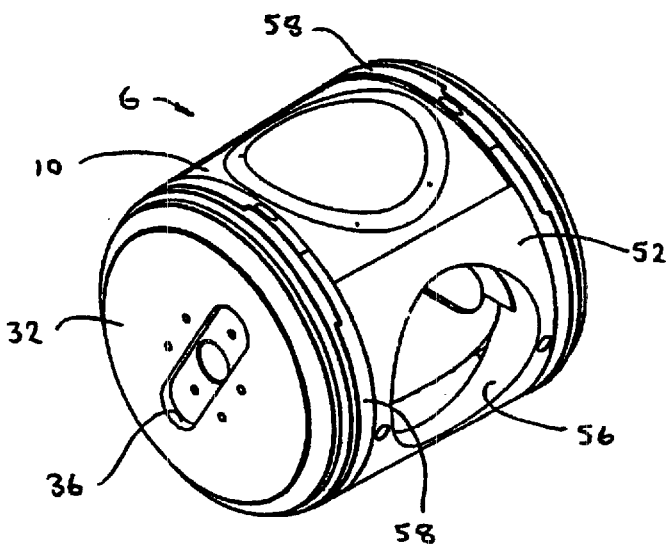
FIG. 1 is a perspective view of assembled internal components of a valve according to a first embodiment the invention ready for insertion into a valve body.
Figure 2:
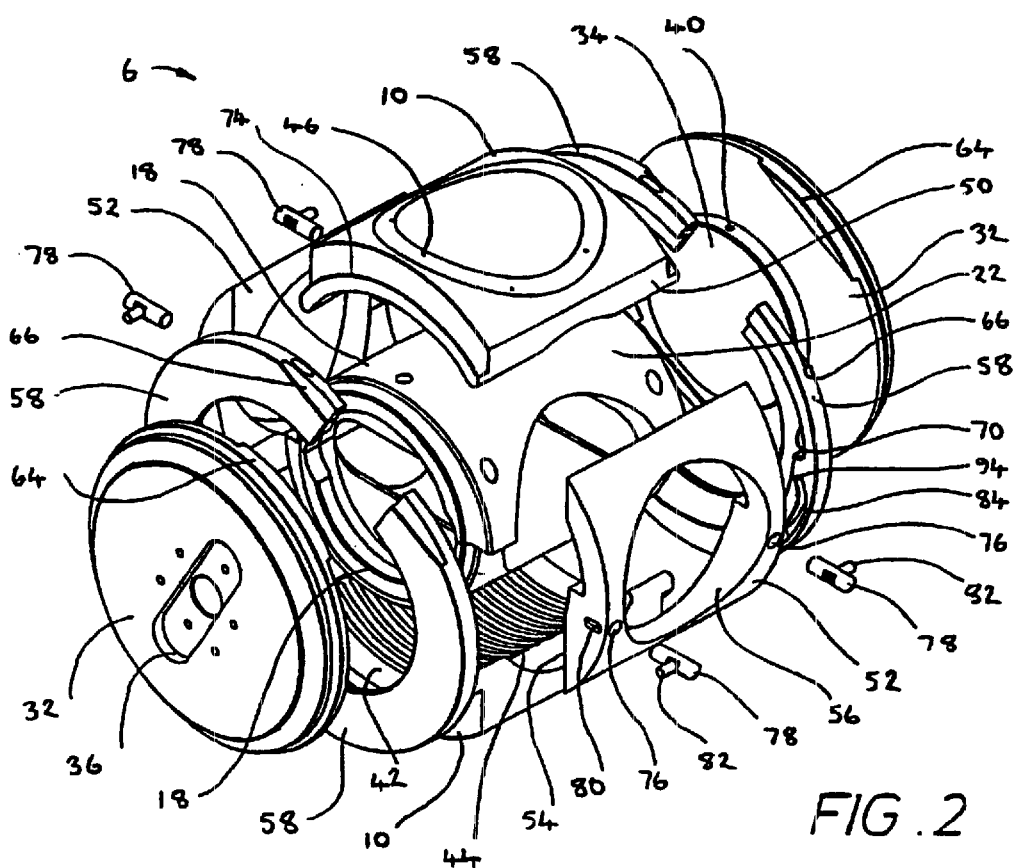
FIG. 2 is an exploded perspective view of the components shown in FIG. 1.

From a comparison of FIGS. 2 and 16, it is apparent that the second embodiment includes significantly less components than the first embodiment and will accordingly be more economic to manufacture.

A third embodiment of the invention will now be described with reference to FIGS. 18 to 22. Many features of the third embodiment are the same as those of the first and more particularly the second embodiment and accordingly are not described below. Such features are labelled in FIGS. 18 to 22 with the same numerals used to designate the corresponding parts in FIGS. 1 to 17. Only features of the third embodiment which differ from those of the second embodiment are described in detail below.

Figure 18:
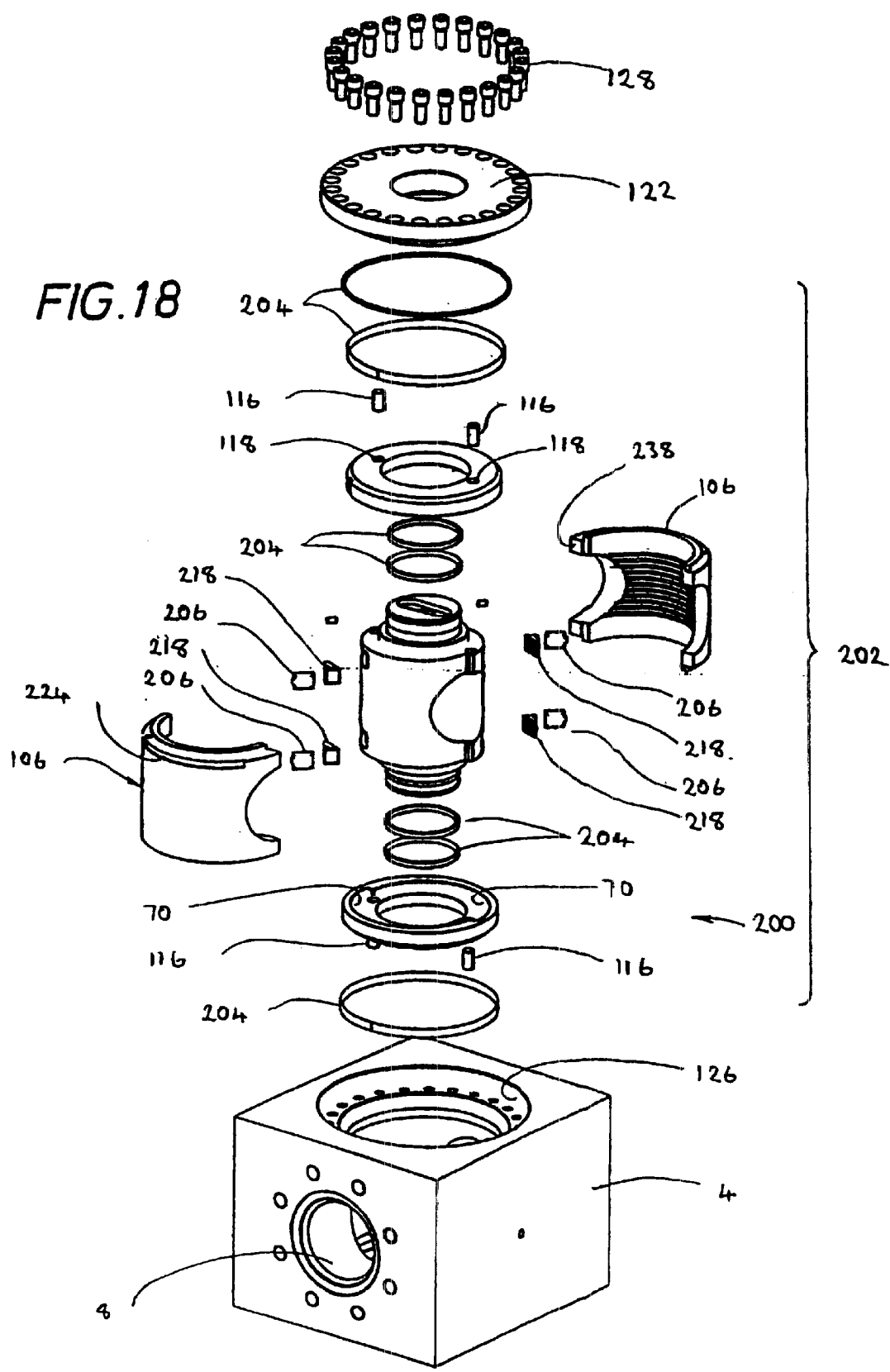
FIG. 18 is a partial exploded isometric view of a valve according to a third embodiment of the invention.
Figure 19:
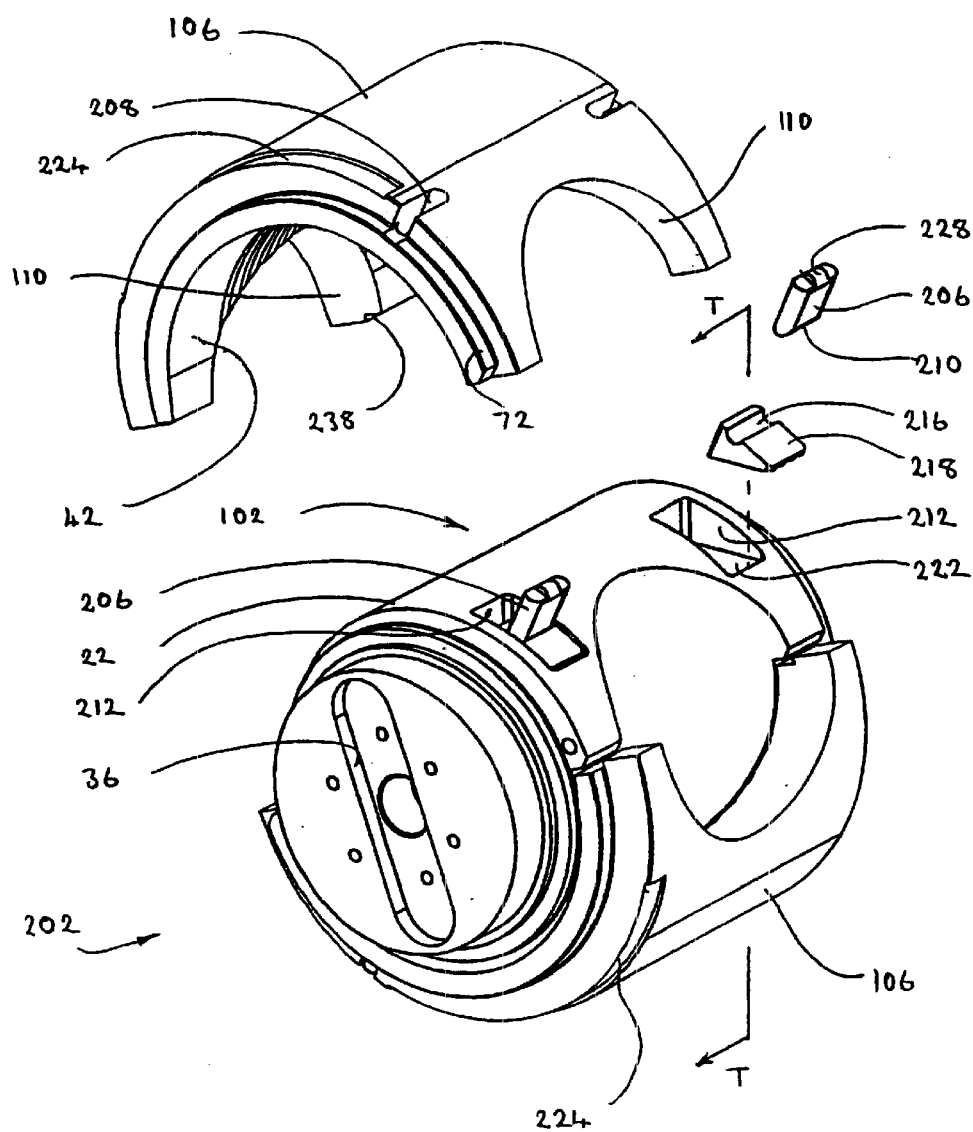
FIG. 19 is an exploded isometric view of the central assembly of the valve shown in FIG. 18.

The third embodiment of the valve 200 is shown in partial exploded form in FIG. 18 and includes a central assembly 202, a valve body 4 and a pair of retaining rings 122 (only upper retaining ring shown) each of which is secured with fasteners 128 in a rebate 126 in an outer face of the valve body 4 to retain the central assembly 202 therein. When the valve is open, a hole 96 in a spool 102 of the central assembly 202 is aligned with through apertures 8 in the valve body 4 to permit fluid to flow through the valve. When the spool 102 and associated seal plates 106 are rotated through 90°, the seal plates 106 are urged outwardly as described above with reference to the first and second embodiments and prevent fluid flow through the valve.

Various sealing rings 204 are shown in FIG. 18 for providing a seal between certain elements of the valve 200. Similar sealing rings will also be included in the valves according to the first and second embodiments of the invention.

The form of and interaction between the parts shown in FIG. 18 and correspondingly numbered parts for the second embodiment shown in FIGS. 16 and 17 are the same except as explained below.

The main difference between the valves according to the second and third embodiments is that the valve 200, according to the third embodiment, does not include latching pins 78, guidance pins 82 and third camming surfaces 84 on its guide plates 112 which act to move the latching pins in and out of engagement with latch holes 86 in the valve body 4. The elements which the valve 200 has in place of these parts will be described in particular with reference to FIG. 19 which is a partially exploded perspective view of the central assembly 202 and FIGS. 20 to 22 which are cross-sections of the assembled valve 200 on the line TT shown in FIG. 19.

In the place of the above described parts of the valve 100 according to the second embodiment, the valve 200 includes radially displaceable clearance members 206 which are slidingly retained in radially extending slots 208 situated adjacent opposite longitudinal ends of each seal plate 106. The inner end 210 of each clearance member 206 projects into a substantially wedge shaped recess 212 in the spool 102 which underlies the corresponding slot 208. Each clearance member 206 has a curved bearing surface 214 which engages a complementarily curved support surface 216 on an outwardly facing surface of a wedging block 218 which is loosely accommodated in the recess 212 and which is dimensioned to accommodate movement of the wedging block 218 relative to the spool 102. An opposite inner face 220 of the wedging block 218 slidingly engages a wedge support surface 222 of the recess 212 which is disposed at an acute angle A relative to a radius r of the spool 102. The outer end 228 of each clearance member 206 is radiused and becomes aligned with a complementarily formed recess 230 in the valve body 4 when the seal plates 106 have been rotated through 90° to their closed position shown in FIG. 22.

One or both ends of each seal plate 106 is provided with a rotation limiting slot or rebate 224 which is engaged by a stop pin or member 226. The arcuate extent of the rebate is such as to permit the seal plates to be rotated through 90°. The rebate 224 accordingly subtends slightly more than 90° at the spools central axis to accommodate the radius of the pin 226. When the valve is fully open (FIG. 20) an open stop end 232 of each rebate 224 is in contact with the associated stop pin 226 and when the valve is fully closed (FIG. 22) as closed stop end 234 of the rebate 224 is in contact with the stop pin 226. In both of these configurations, the stop pin 226 prevents rotation of the seal plates 106, but does not directly prevent rotation of the spool 102.

The sequence of events which occurs as the salve 200 is closed is described below with particular reference to the clearance members and wedging blocks.

Figure 20:
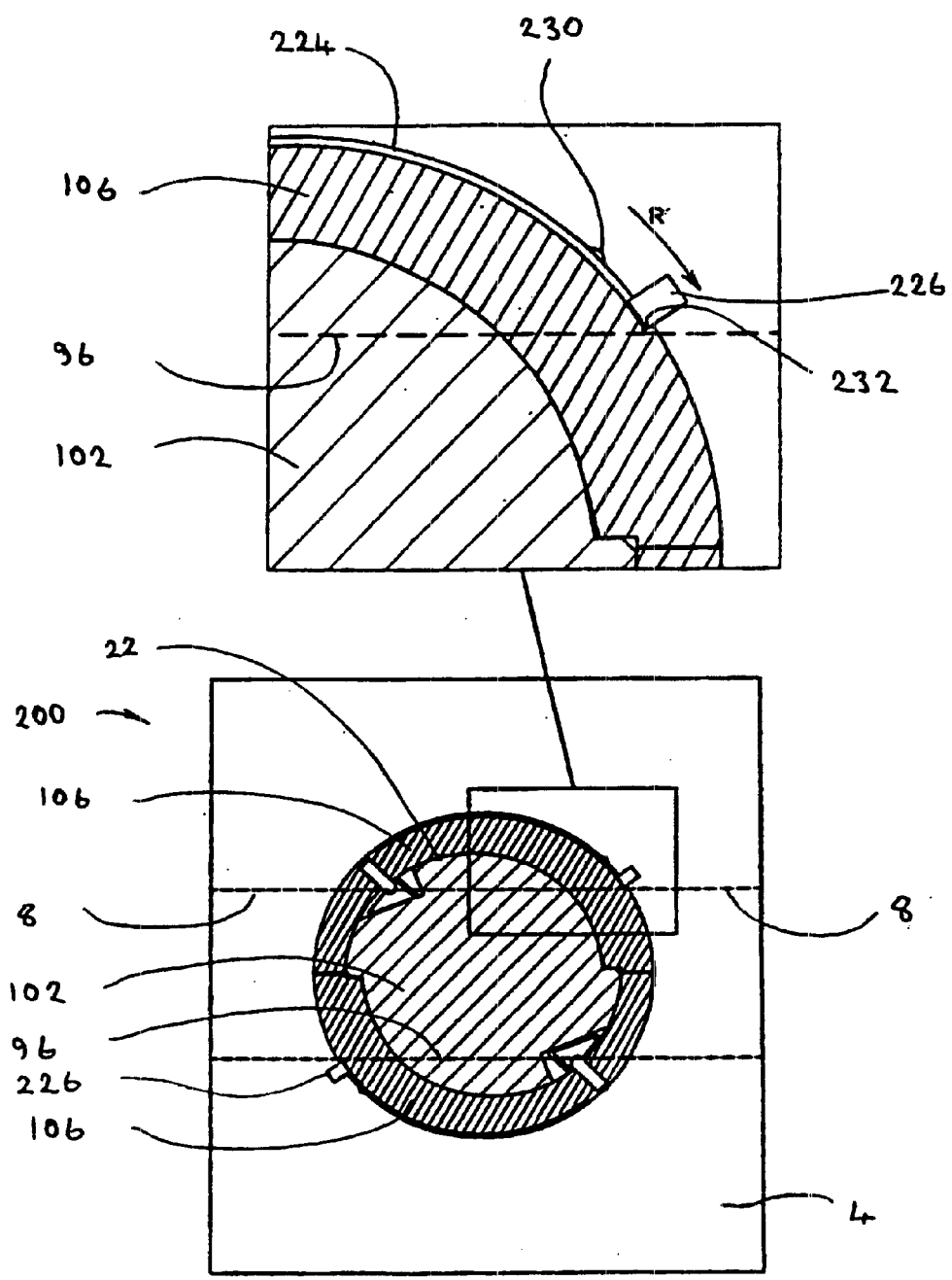
FIGS. 20 to 22 are schematic cross-sections through the valve shown in FIGS. 18 and 19 on the line TT in FIG. 19 showing three stages in the actuation of the valve including and inset enlargement of an important part of the valve.
Figure 21:
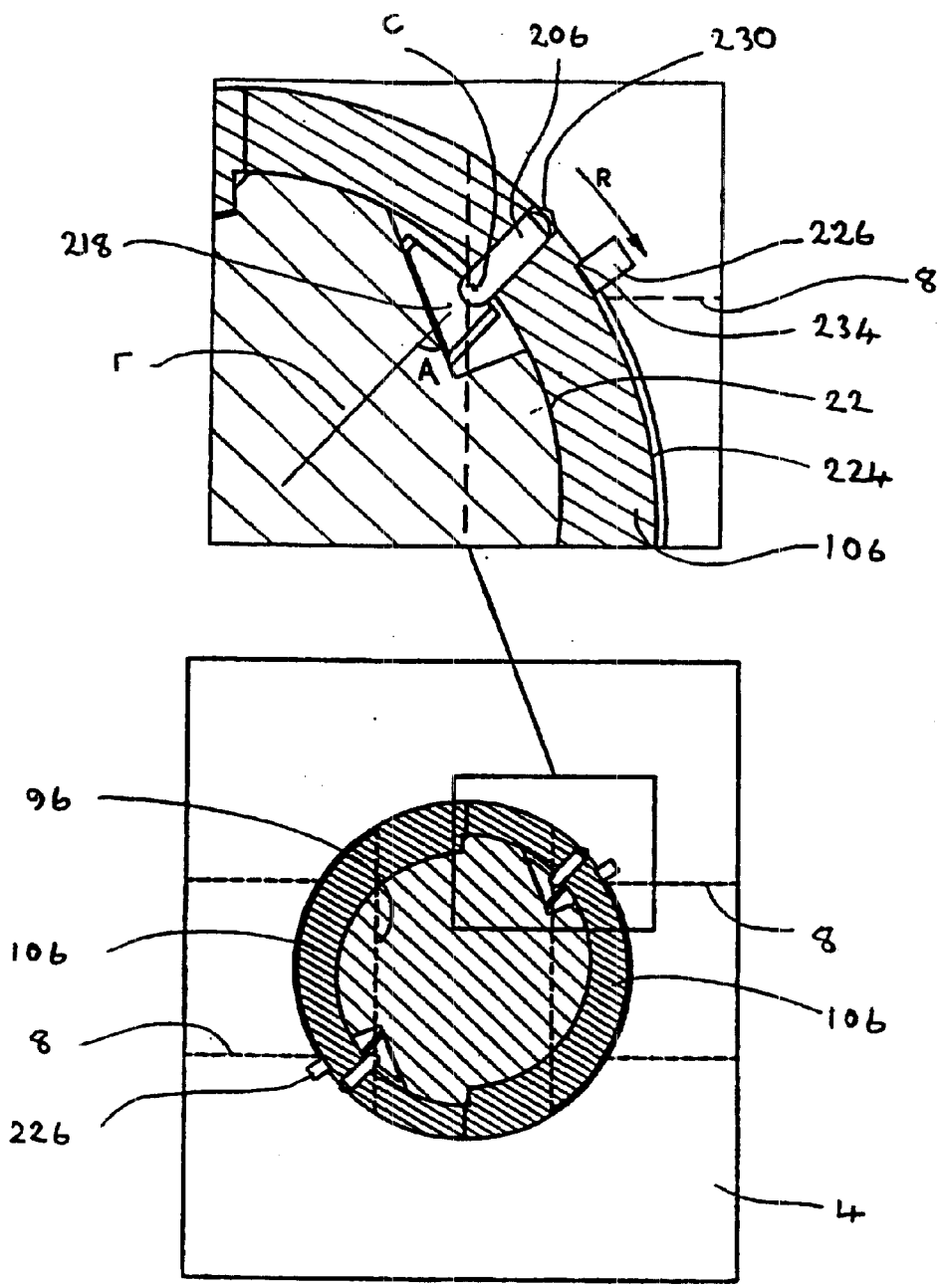
Figure 22:
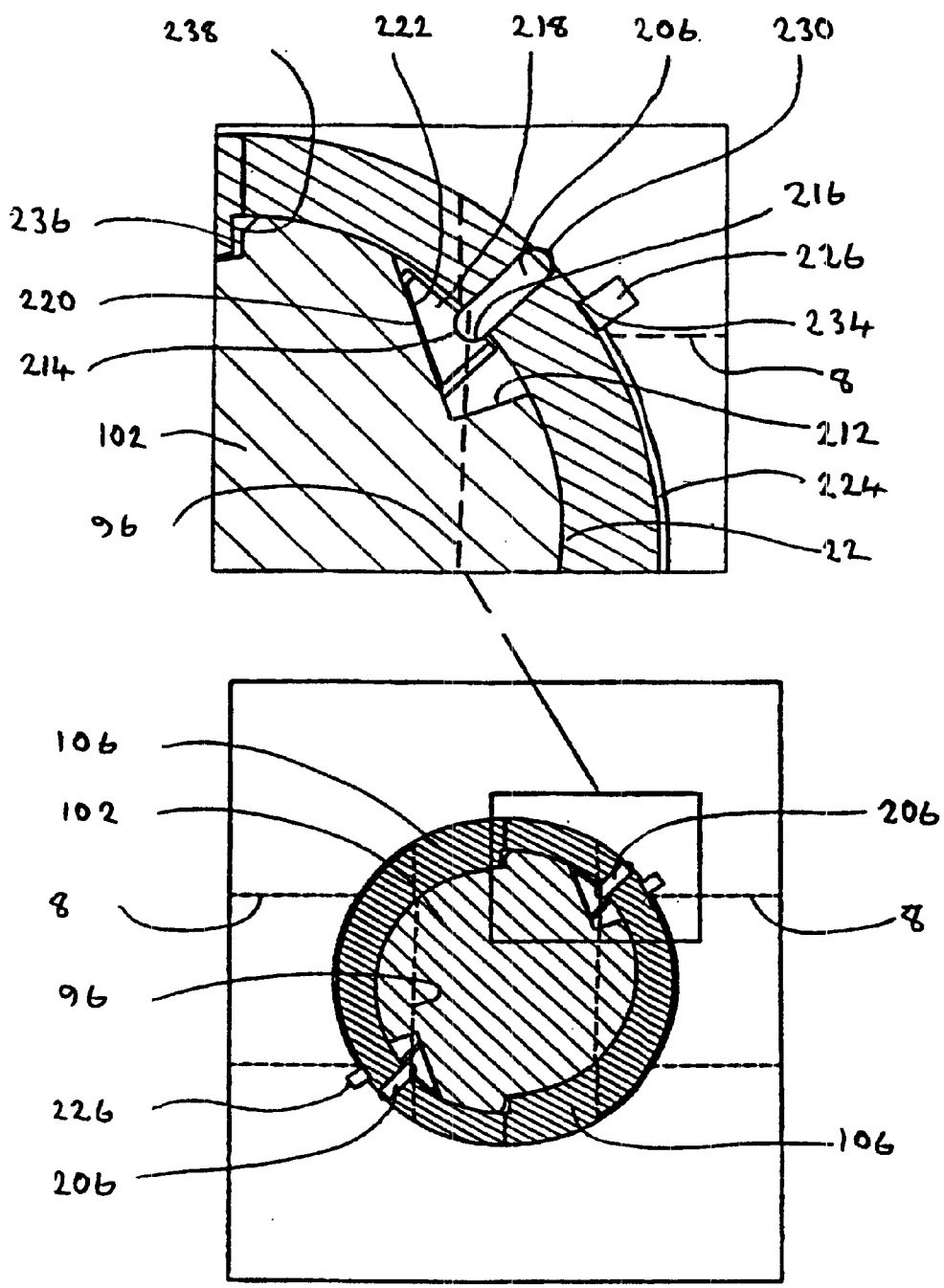

FIG. 20 shows the valve 200 in its open configuration in which the spool hole 96 and the semi-circular cut-outs 110 in the seal plates 106 are aligned with the housing apertures 8. The spool 102 is then rotated by means of the keyway 36 in the direction of the arrow R towards the position shown in FIG. 21. As this occurs, each first camming surface 22 is prevented from jamming the adjacent seal plate 106 against an inner surface of the valve body 4 by the clearance members 206 and wedging blocks 218. These parts are dimensioned such that each clearance member projects by a clearance distance which may be as little as 0.05 mm, outwardly from the outer surface of the sealing plate 106. As a consequence of this clearance, the seal plate is prevented from becoming jammed between the spool 102 and the valve body 4 and shear forces, acting substantially transversely to a radially disposed axis of the clearance members 206 draw the seal plates 106 round as the spool 102 is rotated. The above process continues until the closed stop ends 234 of the rebates 224 come into contact with the stop pins 226 thus preventing further rotation of the seal plates 106 as shown in FIG. 21. At the same time, a central raised portion of the outer end 228 of each clearance member 206 moves outwardly into the associated recess 230 as shown in FIG. 22. Continued rotation of approximately 2° in the direction R causes the first camming surfaces 22 of the spool 102 to urge the seal plates 106 outwardly to seal against complementary sealing surfaces at inner ends of the valve body apertures and open a small gap between each spool shoulder 236 and its adjacent seal plate shoulder 238. As this 2 degree rotation occurs, the wedging block 218 will rotate slightly in a clockwise direction (as seen in FIG. 21) about the centre of curvature c of the radiused inner ends 210 of the clearance member 206 while this member is displaced radially outwardly a small distance due to the clearance member 206 partially entering the recess 230. Each of the four members 206 will behave in a like member.

Opening of the valve 200 involves a reversal of the above steps. The radiused outer end 228 of each clearance member 206 will urge the clearance member 206 inwardly as an initial 2degree opening rotation of the spool 102 occurs. As with the first and second embodiments, inward movement of the seal plates 106 may be assisted by second cam following surfaces 72 at ends of each seal plate 106 engaging second camming surfaces 70 on the guide plates 112 (see FIG. 2).

What is claimed is:

1. A valve (2) comprising a valve body (4) with through flow apertures (8) defining a throughflow direction, two seal means (10) which are urgeable away from each other against complementary sealing surfaces (9) to prevent flow through the throughflow apertures (8) and actuating means (20, 32, 58) which is rotatable in an opening direction about a rotation axis (26) substantially perpendicular to the throughflow direction to rotate each seal means (10) away from its associated throughflow aperture (8) to allow fluid flow therethrough wherein the valve (2) includes restraining means (52, 78, 82) for arresting rotation of each seal means (10) by the actuating means (20, 32, 58) in a closing direction opposite to the opening direction when each seal means (10) is aligned with its associated complementary sealing surface (9), the actuating means (20, 32, 58) including a first camming surface (22) for each seal means (10) which is urged against a first cam following surface (42) of the associated seal means (10) to urge it sealingly against its complementary sealing surface (9) in a direction away from the rotation axis (26) after rotation of the seal means (10) has been arrested and upon further rotation of the actuating means (20, 32, 58) in the closing direction and wherein the actuating means (20, 32, 58) includes a second camming surface (70) for each seal means (10) against which a second cam following surface (72) bears which is urged towards the rotation axis (26) upon initial rotation of the actuating means (20, 32, 58) in the opening direction drawing the seal means (10) away from its associated complementary sealing surface (9).

2. The valve according to claim 1 wherein each first camming surface (22) is situated on the exterior of a central spool part (20) of the actuating means (20, 32, 58).

3. The valve according to claim 1 wherein each first camming surface (22) comprises a portion of a circular cylindrical surface having its central longitudinal axis (24) transversely off-set (e) from the rotation axis (26).

4. The valve according to claim 3 wherein the central longitudinal axes (24) of the two first camming surfaces (22) are transversely off-set (e) from the rotation axis (26) in opposite directions.

5. The valve according to claim 2 wherein the central spool part (20) is constituted by first and second spool halves (18) each having an exterior surface defining one of the first camming surfaces (22).

6. The valve according to claim 1 wherein each seal means (10) includes a seal plate having an arcuate inner surface constituting the first cam following surface (42).

7. The valve according to claim 1 wherein each seal means (10) comprises a seal plate with a metal seal (46) on an outer surface thereof.

8. The valve according to claim 1 wherein each second camming surface (70) and second cam following surface (72) comprise a part of a circular cylindrical surface.

9. The valve according to claim 1 wherein the second cam following surface (72) of each seal means (10) is situated at an end region of the seal means (10).

10. The valve according to claim 9 wherein second cam following surfaces (72) are situated at opposite end regions of each seal means (10) and each engaged by a corresponding second camming surface (70) of the actuating means (20,32,58).

11. The valve according to claim 10 wherein the second camming surfaces (70) are situated adjacent ends of a central spool part (20) of the actuating means (20,32,58).

12. The valve according to claim 1 wherein the actuating means (20,32,58) includes a plate (58) projecting radially outwardly with respect to the rotation axis (26).

13. The valve according to claim 12 wherein the second camming surfaces (70) are formed in the plate (58).

14. The valve according to claim 12 wherein the or each latch member (78) includes guide means (82) which engages a third camming surface (84), and the or each third camming surface (84) is provided by the plate means (58) whereby initial opening rotation of the actuating means (20,32,58) unlatches the or each latch member (78).

15. The valve according to claim 1 wherein the restraining means (52,78,82) includes restraining members (52) which slidingly engage the seal means (10) to limited radial displacement of the seal means (10).

16. The valve according to claim 15 wherein the restraining means (78,82) includes at least one displaceable latch member (78), and the or each latch member (78) is supported by one of the restraint members (52) and is radially displaceable relative thereto for engaging a corresponding aperture (86) in the valve body (40).

17. The valve according to claim 1 including engagement means (88,90) cooperable between the actuating means (20,32,58) and the valve body (4) for limiting rotation of the actuating means (20,32,58) relative to the valve body (4) about the rotation axis (26).

18. The valve according to claim 17 wherein the engagement means (88,90) permits between 115° and 145° of rotation of the actuating means (20,32,58) relative to the valve body (4).

19. The valve (200) according to clam 1 wherein the restraining means comprises a stop member (226) fixed relative to either one of the seal means (106) or the valve body (4) and a stop member path (224) with stop member end stops (232,234) which path (224) is fixed relative to or defined in the other of the seal means (106) or the valve body (4).

20. The valve according to claim 1 wherein the restraining means (224,226) permits the seal means (106) to be rotated by 90° between valve fully closed and valve fully opened configurations.

21. A valve (2) comprising a valve body (4) with through flow aperture (8) defining a throughflow direction, two seal means (10) which are urgeable away from each other against complementary sealing surfaces (9) to prevent flow through the throughflow apertures (8) and actuating means (20, 32, 58) which is rotatable in an opening direction about a rotation axis (26) substantially perpendicular to the throughflow direction to rotate each seal means (10) away from its associated throughflow aperture (8) to allow fluid flow therethrough, wherein the valve (2) includes restraining means (52, 78, 82) for arresting rotation of each seal means (10) by the actuating means (20, 32, 58) in a closing direction opposite to the opening direction when each seal means (10) is aligned with its associated complementary sealing surface (9), the actuating means (20, 32, 58) including a first camming surface (22) for each seal means (10) which is urged against a first cam following surface (42) of the associated seal means (10) to urge it sealingly against its complementary sealing surface (9) in a direction away from the rotation axis (26) after rotation of the seal means (10) has been arrested and upon further rotation of the actuating means (20, 32, 58) in the closing direction wherein the restraining means (78, 82) includes at least one displaceable latch member (78) which is engageable for arresting rotation of each seal means (10) and the or each latch member (78) includes guide means (82) which engages a third camming surface (84).

22. The valve according to claim 21 wherein the or each latch member (78) is radially outwardly displaceable for engaging a corresponding aperture (86) in the valve body (4).

23. A valve (2) comprising a valve body (4) with through flow apertures (8) defining a throughflow direction, two seal means (10) which are urgeable away from each other against complementary sealing surfaces (9) to prevent flow through the throughflow apertures (8) and actuating means (20, 32, 58) which is rotatable in an opening direction about a rotation axis (26) substantially perpendicular to the throughflow direction to rotate each seal means (10) away from its associated throughflow aperture (8) to allow fluid flow therethrough, wherein the valve (2) includes restraining means (52, 78, 82) for arresting rotation of each seal means (10) by the actuating means (20, 32, 58) in a closing direction opposite to the opening direction when each seal means (10) is aligned with its associated complementary sealing surface (9), the actuating means (20, 32, 58) including a first camming, surface (22) for each seal means (10) which is urged against a first cam following surface (42) of the associated seal means (10) to urge it sealingly against its complementary sealing surface (9) in a direction away from the rotation axis (26) after rotation of the seal means (10) has been arrested and upon further rotation of the actuating means (20, 32, 58) in the closing direction and wherein the actuating means includes a jam prevention mechanism (206, 218) for preventing rotational jamming of the seal means (106) as the actuating means (102) is rotated in the closing direction.

24. The valve according to claim 23 wherein the jam prevention mechanism (206, 218) includes a projection (228) which extends outwardly from an outer face of each seal means (106) to hold the outer face away from a surface past which it is rotated and a recess (230) into which the projection (228) passes upon alignment of each seal means (106) with its complementary sealing surface.

25. The valve according to claim 24 wherein each projection (228) comprises an outer end of a clearance member (206) which is radially displaceably supported in an aperture (208) in one of the seal means (106).

26. The valve (200) according to claim 25 wherein each clearance member (206) extends inwardly from an inner surface of the seal means (106) in which it is supported and the jam prevention mechanism further comprises a device (218) which supports an inner end (210) of the clearance member (206) and permits limited rotational displacement of the actuating means (102) relative to the seal means (106) in the closing direction subsequent to the projection (228) passing into the recess (230).

* * * * *